United States Patent [19]

Barth

[11] Patent Number: 5,771,089
[45] Date of Patent: Jun. 23, 1998

[54] PROGRESSIVE SPECTACLE LENS

[75] Inventor: Rudolf Barth, Vierkirchen, Germany

[73] Assignee: Optische Werke G. Rodenstock, Germany

[21] Appl. No.: 857,768

[22] Filed: May 16, 1997

Related U.S. Application Data

[63] Continuation of Ser. No. 739,608, Oct. 30, 1996, abandoned, which is a continuation of Ser. No. 571,681, Dec. 13, 1995, abandoned, which is a continuation of Ser. No. 363,302, Dec. 21, 1994, abandoned, which is a continuation of Ser. No. 227,909, Apr. 15, 1994, abandoned, which is a continuation of Ser. No. 76,472, Jun. 14, 1993, abandoned, which is a continuation of Ser. No. 965,512, Oct. 23, 1992, abandoned, which is a continuation of Ser. No. 861,176, Mar. 27, 1992, abandoned, which is a continuation of Ser. No. 735,169, Jul. 23, 1991, abandoned, which is a continuation of Ser. No. 596,734, Oct. 10, 1990, abandoned, which is a continuation of Ser. No. 407,685, Sep. 14, 1989, abandoned, which is a continuation of Ser. No. 871,423, Apr. 7, 1986, abandoned.

[30] Foreign Application Priority Data

Aug. 17, 1984 [DE] Germany ............... 34 30 334.0

[51] Int. Cl.$^6$ ................................................ G02C 7/06
[52] U.S. Cl. ................................................ 351/169
[58] Field of Search ........................ 351/169, 172

[56] References Cited

U.S. PATENT DOCUMENTS 3,877,798  4/1975  Tolar et al. .................. 351/172
4,315,673  2/1982  Guilino et al. .............. 351/169
4,592,630  6/1986  Okazaki ....................... 351/169

FOREIGN PATENT DOCUMENTS

0032121  4/1981  Japan ......................... 351/169

*Primary Examiner*—Hung X. Dang
*Attorney, Agent, or Firm*—Kalish & Gilster

[57] ABSTRACT

A progressive spectacle lens is described which has a convex aspherical front surface 1 and a concave aspherical back surface 2, of which at least one surface contributes to the power increase from the distance portion 3 over the progression corridor 4 to the reading portion 5. The progressive spectacle lens in accordance with the present invention is characterized by the fact that the surface 1 or the surfaces contributing to the power increase are designed in such a way that the main portion of astigmatism is transposed into an area 3 in which the power practically does not increase and by the fact that the surface astigmatism of the two surfaces 1 and 2 substantially cancel each other out in these areas 3 or 6. (See FIG. 1).

8 Claims, 6 Drawing Sheets

| SAGITTA | | | | | | | | X (MM) | RADII (HORIZONTAL) | | | | | | | |
|---|---|---|---|---|---|---|---|---|---|---|---|---|---|---|---|---|
| 28 | 24 | 20 | 16 | 12 | 8 | 4 | 0 | Y (MM) | 0 | 4 | 8 | 12 | 16 | 20 | 24 | 26 |
|  | 8.754 | 7.282 | 6.112 | 5.264 | 4.712 | 4.424 | 4.333 | 28 | 88 | 79 | 64 | 55 | 55 | 62 | 76 |  |
| 9.212 | 7.505 | 6.060 | 4.915 | 4.085 | 3.550 | 3.261 | 3.171 | 24 | 89 | 81 | 66 | 57 | 55 | 62 | 76 | 88 |
| 8.148 | 6.463 | 5.039 | 3.913 | 3.038 | 2.571 | 2.286 | 2.198 | 20 | 90 | 82 | 67 | 58 | 56 | 62 | 75 | 88 |
| 7.292 | 5.623 | 4.214 | 3.102 | 2.237 | 1.776 | 1.434 | 1.406 | 16 | 91 | 83 | 68 | 59 | 57 | 63 | 75 | 89 |
| 6.640 | 4.980 | 3.581 | 2.477 | 1.678 | 1.161 | 0.880 | 0.793 | 12 | 91 | 83 | 69 | 59 | 57 | 62 | 75 | 89 |
| 6.184 | 4.523 | 3.136 | 2.036 | 1.233 | 0.723 | 0.442 | 0.354 | 8 | 91 | 83 | 69 | 59 | 57 | 63 | 75 | 88 |
| 5.914 | 4.263 | 2.874 | 1.777 | 0.981 | 0.462 | 0.178 | 0.089 | 4 | 90 | 82 | 69 | 60 | 58 | 63 | 75 | 87 |
| 5.829 | 4.184 | 2.803 | 1.710 | 0.910 | 0.384 | 0.092 | 0.000 | 0 | 87 | 81 | 69 | 61 | 59 | 64 | 74 | 85 |
| 5.938 | 4.303 | 2.937 | 1.850 | 1.044 | 0.500 | 0.192 | 0.093 | −4 | 81 | 77 | 69 | 63 | 62 | 65 | 73 | 79 |
| 6.259 | 4.636 | 3.283 | 2.203 | 1.392 | 0.825 | 0.492 | 0.383 | −8 | 73 | 72 | 69 | 67 | 66 | 68 | 71 | 73 |
| 6.819 | 5.134 | 3.850 | 2.771 | 1.943 | 1.358 | 1.009 | 0.893 | −12 | 69 | 69 | 69 | 69 | 69 | 69 | 69 | 69 |
| 7.637 | 5.934 | 4.636 | 3.545 | 2.706 | 2.112 | 1.758 | 1.639 | −16 | 68 | 68 | 68 | 69 | 69 | 69 | 68 | 68 |
| 8.723 | 7.057 | 5.676 | 4.568 | 3.716 | 3.113 | 2.753 | 2.633 | −20 | 67 | 67 | 67 | 68 | 68 | 68 | 67 | 67 |
| 10.108 | 8.393 | 6.983 | 5.858 | 4.983 | 4.375 | 4.008 | 3.885 | −24 | 66 | 66 | 66 | 66 | 67 | 66 | 66 | 66 |
|  | 10.033 | 8.592 | 7.432 | 6.542 | 5.912 | 5.536 | 5.411 | −28 | 64 | 64 | 65 | 65 | 65 | 65 | 64 |  |

PROGRESSIVE SPECTACLE LENS

This application is a continuation of application Ser. No. 08/739,608 filed Oct. 30, 1996, now abandoned which is a continuation of application Ser. No. 08/571,681 filed Dec. 13, 1995, now abandoned which is a continuation of application Ser. No. 08/363,302 filed Dec. 21, 1994, now abandoned which is a continuation of application Ser. No. 08/227,909 filed Apr. 15, 1994, now abandoned which is a continuation of application Ser. No. 08/076,472 filed Jun. 14, 1993, now abandoned which is a continuation of application Ser. No. 07/965,512 filed Oct. 23, 1992, now abandoned which is a continuation of application Ser. No. 07/861,176 filed Mar. 27, 1992, now abandoned which is a continuation of application Ser. No. 07/735,169 filed Jul. 23, 1991, now abandoned which is a continuation of application Ser. No. 07/596,734 filed Oct. 10, 1990, now abandoned which is a continuation of application Ser. No. 07/407,685 filed Sep. 14, 1989, now abandoned which is a continuation of application Ser. No. 06/871,423 filed Jul. 7, 1986, now abandoned.

TECHNICAL BACKGROUND

The present invention relates to a multifocal spectacle lens having a progressive transition between distance and reading portions.

STATE OF THE ART

Progressive spectacle lenses have a distance portion in their upper half, a reading portion in their lower half, and between the two is a progression area in which the power increases from that of the distance portion to that of the reading portion. Ideally, both the distance portion and the reading portion should be as large as possible and the progression area should allow uninterrupted vision for intermediate distances.

To obtain a distance portion with the largest possible dimensions and a reading portion with the largest possible dimensions, East German (German Democratic Republic) Patentschrift DD-PS 71 210, for instance, suggests using spherical surfaces for the distance portion and the reading portion between which there is a relatively short progression area. This type of progressive spectacle lens does permit more or less uninterrupted distance and near vision but the progression area is practically not suitable for clear vision because of the distortion in the periphery so that this type of spectacle lens must really be seen as a bifocal lens with a "masked" dividing line. With these known progressive spectacle lenses all that can be achieved is therefore merely a cosmetic improvement due to the lack of the dividing line of bifocal lenses; an improvement of vision in the intermediate area is, however, not possible.

On the other hand, a number of proposals have been made to obtain a progression area suitable for clear vision.

For example, the U.S. Pat. Nos. 2,109,474 and 2,878,721, the German patent documents DE-AS 20 44 639, DE PS 23 36 708, DE-OS 24 39 127, DE-OS 30 16 935 and DE-OS 31 47 952 all describe progressive spectacle lenses based on the following, common principle:

In the upper part of the progression area and also in a part of the area actually designed as the distance portion, the surface focal power increases (essentially) from the lens center to the lens rim while it decreases from the lens center to the lens rim in the lower part of the progression area and in the reading portion. As a result, the focal power increase in the lens periphery is substantially less than on the main meridian, that is about in the lens center; in other words, in the lens periphery the differences between distance portion and reading portion become smaller. Thanks to this design principle, it is possible to distribute irritating astigmatism almost totally over the whole surface with peaks being "displaced" into the lower peripheral areas. A disadvantage is, however, the power decrease in the reading portion in the horizontal direction together with a simultaneous high increase in astigmatism. For example, the width of the reading portion in the area of the so-called near reference point is only about 15 mm. This means that with these known progressive lenses it is, for example, no longer possible to have a newspaper page fully in view so that head movements are required when reading. In addition, with these known progressive lenses that part of the progression area which is suitable for clear vision in the intermediate area is narrowed to a few millimeters due to the rapidly increasing astigmatism. For this reason, these known progressive lenses require either a main meridian which winds from distance to near in accordance with the movements of the eye or these lenses must be rotated, that is, they must be fitted into the spectacle frame with a main meridian turned through about 6 to 10 $\mu$. This requires the lenses to be fitted very exactly into the spectacle frame; if the fitting process is not precise or if the "fit" of the frame alters, then the lenses may easily become incompatible.

A number of different authors (reference being made, for example, to U.S. Pat. No. 2,878,721, column 1, line 55 ff) have expressed their assumption that the basic principles involved preclude any improvement to lenses of the type discussed above as a progressive spectacle lens with a progressive surface necessarily must show a certain amount of astigmatism.

For this reason, it is suggested, for example, in British patent 876 798 that a progressive surface be used which shows constant astigmatism over the whole surface. As a second surface, a non-progressive surface with equal but opposite astigmatism is used so that (in theory) a lens free of astigmatism is produced. A progressive lens with constant astigmatism over the whole surface, would, however, as the only example version of British patent 876 798 also shows, have an extremely unfavorable progression distribution which would have produce the result that the lens would practically no reading portion with a constant surface focal power.

Another proposal for the overcoming of the "astigmatism problem" was made as early as 1953 in British patent 775 007:

In said British patent 775 007, a progressive spectacle lens with two spherical surfaces is proposed, of which at least one surface contributes to the power increase from the distance portion, through the progression area to the reading portion. In this patent, which goes into practically no detail, all that is said on the design of the two aspherical surfaces is that at least one of them is a rotated surface (page 1, line 89 ff) and that for each surface point on both surfaces the horizontal curvature is greater than the vertical (page 2, line 10 ff).

This condition for the horizontal and vertical curvatures at all surface points allows the conclusion that the author of British patent 775 007 is following a design of distributing the surface astigmatism of both surfaces as uniformly as possible over each surface as regards amount and of making it of equal and, as far as possible, opposite power for corresponding vision points on the front surface and the back surface.

Investigations made by the submitter of this present patent application have, however, shown that with such a surface design—despite the greater freedom due to the use of two aspherical surfaces—no substantial advantages can be obtained over progressive lenses where only one surface has an aspherical design. In particular, neither the astigmatism in the progression area nor the power decrease in the reading portion can be reduced significantly.

REPRESENTATION OF THE INVENTION

The object of this invention is to further develop a progressive lens of the type known from British patent 775 007 in such a way that it will show a wide progression area, in which clear vision is possible in the intermediate area, and a large distance portion and a large reading portion with a practically constant power and low astigmatism.

The present invention is based on the knowledge that a progressive surface must show a certain amount of astigmatism. This astigmatism can be either concentrated mostly in certain areas of the surface or spread over the whole surface more or less uniformly. In accordance with the present invention it has been recognised that a progressive spectacle lens which achieves the object stated above can be achieved neither by spreading the astigmatism uniformly over the surface nor by displacing the astigmatism into the lower peripheral areas and so into the progression area, as in both cases, the astigmatism in conjunction with the required increase in the surface focal power in the progression area narrows this progression area to a corridor suitable for clear vision of only narrow dimensions. In accordance with the present invention it has been recognised that to obtain a progressive spectacle lens to achieve the stated object it is both necessary and possible to relocate the main portion of surface astigmatism into an area in which the power substantially does not increase at all. In this way, a progression area can be obtained which is largely free of astigmatism, which is relatively wide, and which permits clear vision in the intermediate area. In addition, the surface astigmatism in that area in which it has been relocated, and in which the power shows practically no change, can be compensated without difficulty by the astigmatism of the opposite surface as no additional condition must be met for a power increase. In this way, a lens is obtained whose distance portion and reading portion are largely free of astigmatism and which have a substantially constant power.

The two surfaces of the spectacle lens in accordance with the present invention can have a similar construction to known lenses apart from the fact that they are designed in such a way that the astigmatism has been pushed into a certain area or certain areas. For example, the curvature radius of the section curves, which arise through the cutting of the surface by the planes orthogonal to the relevant main meridian, can change montonically in the progression area with increasing distance to the main meridian in accordance with the rule stated in above-referenced German DE AS 20 44 639. Furthermore, the individual surfaces can also be combined together partially with a constant second derivation. As well, surface properties can be pre-determined and the surfaces then be calculated using Spline functions.

The calculation of the surfaces can be done in a method known per se where in an advantageous way first the progression area is optimised without any account being taken of the surface properties of the distance portion and/or the reading portion. The optimising of the distance portion and/or the reading portion with regard to power and astigmatism is then effected using the opposite surface.

It is, however, of special advantage, both with regard to the surface properties and with regard to the simplicity of the calculation, to design at least one of the surfaces with periodic functions such as are given in the German DE-OS 28 14 916. With regard to all terms and calculation methods not explained individually here, reference is explicitly made to this publication.

The progressive spectacle lens in accordance with this invention can furthermore be designed without difficulty in such a way that in the progression area, the lines of constant power run largely horizontally. With regard to the advantages of this course of the lines of constant power with a lens with two progressive surfaces or the lines of constant surface focal power reference is made to German Auslegeschrift DE-AS 26 10 203.

Furthermore, the progressive spectacle lens in accordance with this invention has the surprising advantage that distortion is low.

The central idea in accordance with this invention of transposing the irritating surface astigmatism into an area where the power does not increase also permits very large freedom in design.

The spectacle lens in accordance with this invention can, in a way known per se, possess surfaces whose main meridians are formed as umbilical lines or on which astigmatism is at least partially present, which astigmatism is, however, compensated for by the astigmatism of the opposing surface.

The main meridians can be winding, i.e. the main meridian curves are not in the same plane; the main meridian curves can, however, also be plane and the lens be fitted to a spectacle frame in a rotated position.

Of course, it is also possible to calculate the spectacle lens according to the present invention which is provided with a winding main meridian, or which is fitted into a spectacle frame in a rotated position, in such a way that it is horizontally symmetrical in the fitted position.

It is, however, of particular advantage that the large distance portion which is practically free of astigmatism and the large reading portion which is practically free of astigmatism as well as the wide progression area in which clear vision is possible permit the lens to be fitted into the frame without rotation and without this resulting in any physiological impairments.

In this way, a horizontal lens is obtained without any great effort in the calculation process, which could only be obtained with great effort in the calculation process when fitted in a rotated position or when with a winding main meridian, which would also require the surfacing of so-called "left" and "right" lenses.

In accordance with one aspect of the invention only one surface contributes to the power increase while the other surface is provided solely for the compensation of the surface astigmatism in that area in which the surface astigmatism has been transposed.

In accordance with claim 3 the opposing surface in that area in which the surface astigmatism has been transposed, has substantially the same design. This means, for example, that the course of the lines of intersection which arise from the intersection of both surfaces with planes orthogonal to the relevant main meridian follow the same mathematical interrrelationship for curves whose points of intersection with the relevant main meridian are at an equal distance from the lens centre.

It is of particular advantage when that area in which the power increase has been transposed is the distance portion.

This, for example, permits the construction of a distance portion which is practically completely free of astigmatism and which is afocal when the two surfaces in the area of the distance portion have a substantially matching construction; in this way, the lens is suitable for so-called emmetropic presbyopes.

The remaining part of the surface may have a spherical or toric design, whereby a surface construction is produced which is simple to manufacture.

The spherical or toric area of the surface with no power increase can be connected to that area in which the astigmatism has been transposed by means of an transitional area or discontinuously, i.e. with a "jump" or an "edge".

In the case of a continuous transitional area with a height of, for example, some millimeters, a continuous progression increase is obtained from the distance portion to the near portion. On the other hand, a discontinous connection allows the power increase of the progressive spectacle lens, i.e. the addition, to be determined by the surface focal power of the spherical or toric surface—if a jump in power is acceptable. For example, if the progressive surface is the front surface, with a distance portion surface focal power of 5.56 D and a surface focal power for the reading portion of 7.56 D for a surface focal power of the spherical surface part of the back surface of 5.56 D, an addition of 2.0 D is obtained, while a surface focal power of the back surface of −6.56 produces an addition of 1.0 and a surface focal power of −4.56 an addition of 3.0. The slight physiological impairment due to the "jump" in surface focal power at the transition line between that part of the rear surface designed for the compensation of surface astigmatism and the spherical part is not felt to be a source of irritation by most wearers of the progressive spectacle lens.

An adaptation of a spectacle lens in accordance with one inventive aspect whose front surface and rear surface produce a distance portion with no-optical power to certain prescription values, i.e. to certain optical values for the correction of ocular impairments for distance vision, is possible without difficulty by fixing another lens to the progressive spectacle lens, whereby such other lens is preferably affixed to the back surface of the progressive spectacle lens. This other lens has a different refractive index to the refractive index of the progressive spectacle lens. It is, of course, necessary to set off the surface of the progressive spectacle lens in which the auxiliary lens has been fixed "against the other lens", and, if necessary, to modify the construction of the surface in such a way that the correction principles characterized above are preserved.

The other lens can, for example, be fused on or cemented on. It is of advantage when the surface of the progressive spectacle lens is designed in such a way that when the two lenses are fused, the auxiliary lens sinks down on the surface of the progressive spectacle lens so that the working of the auxiliary lens before the joining to the progressive spectacle lens is simplified.

The affixing of another lens to a progressive spectacle lens is, incidentally, known; reference is made in this regard to the article "Clinical experience of varifocal spectacle lenses" by Colin Fowler in "The Optician", July, 1982.

BRIEF DESCRIPTION OF THE DRAWINGS

The present invention is described below in detail using a version example with reference being made to the drawing in which.

DESCRIPTION OF THE PREFERRED EMBODIMENTS

Figure 1:
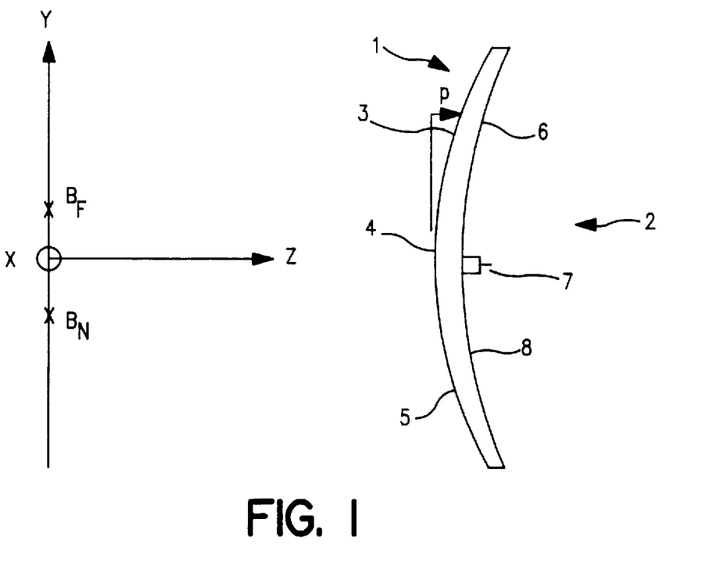
FIG. 1 shows a section through a version example of a progressive spectacle lens.

FIG. 1 shows a longitudinal section through such a lens in order to explain in principle the construction of a progressive spectacle lens in accordance with the present invention. The spectacle lens according to this invention shows a convex, aspherical front surface 1 and a concave aspherical back surface 2. The front surface 1 is a progressive surface, i.e. its surface focal power increases from the distance portion 3 over the progression area 4 to the reading portion 5. The back surface 2 does not contribute to the power increase. In the upper area, i.e. in part 6, which is opposite to the distance portion 3 of the front surface 1, the back surface 2 is designed in such a way that its surface astigmatism compensates the surface astigmatism of the front surface 1 in this area. Connected to the surface part 6 is a narrow transition area 7 through which the back surface moves continuously from part 6 into a spherically designed part 8.

Furthermore, the position of the Cartesian coordinate system used below with the axes x, y and z and the sagitta $p_z = p(x,y)$ used to describe the surfaces is also marked on FIG. 1.

Below a numerical version example of the present invention is described in connection with FIGS. 2 to 7.

The version example according to these figures shows a progressive front surface whose surface focal power on the main meridian increases from 5.56 D to 7.56 D, i.e. the so-called addition A is 2.0 D. The back surface 2 has a constant surface focal power on its "main meridian" of −5.56 D. The calculation process for this version example is effected using the equation set given in DE-OS 28 14 916. The refractive index on which the calculation is based is 1.525.

Figure 2:
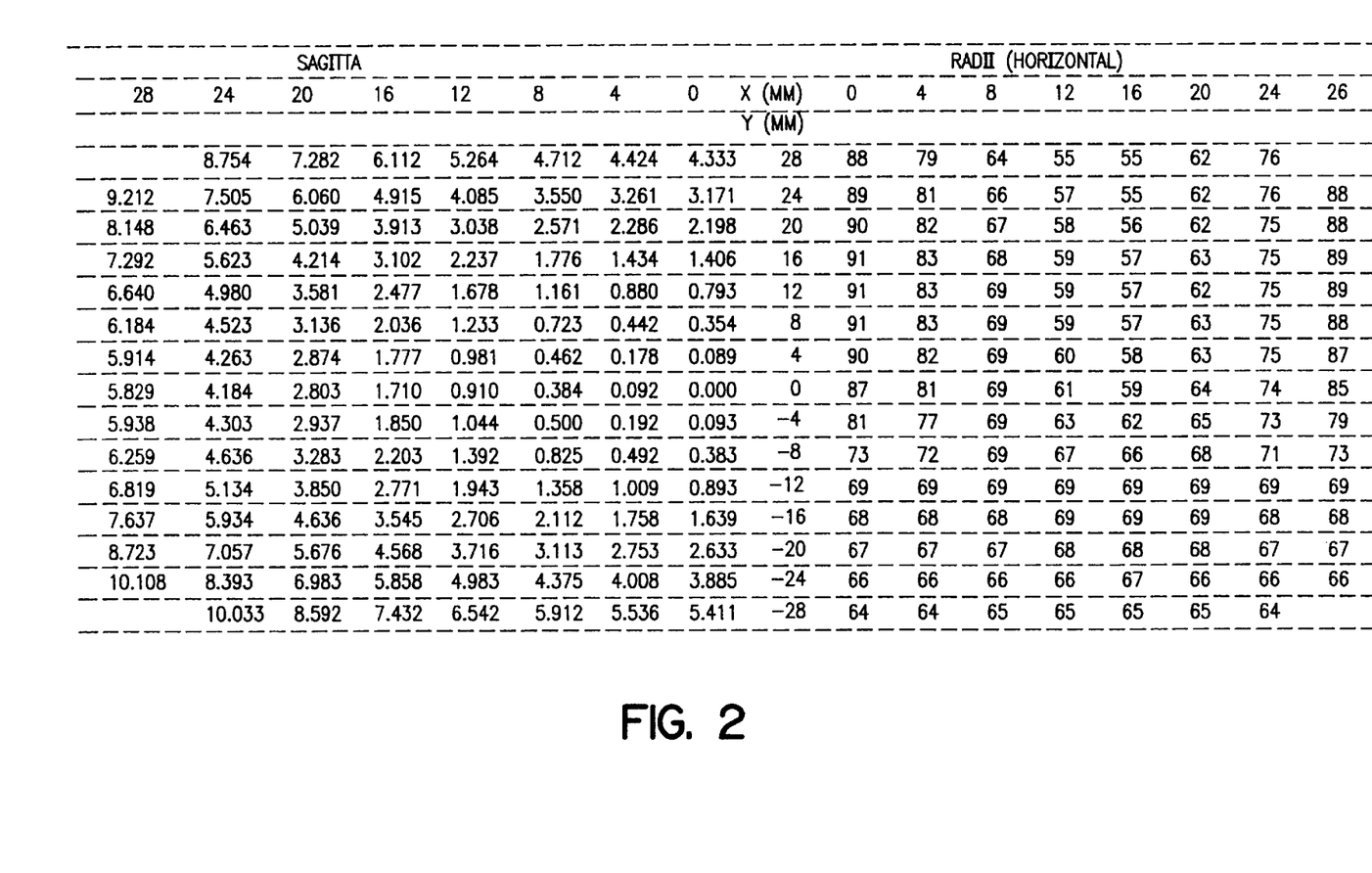
FIG. 2 shows the sagitta and horizontal curvature radii of the front surface of a first version example of the present invention in tabular form.

FIG. 2 shows a chart where the sagitta p (see FIG. 1) for surface points (x,y) of the front surface 1 of this version example are shown on the lefthand side. In the righthand part of the chart, the horizontal curvature radii for these surface points, i.e. the curvature radii of the section lines produced from the intersection of the plane parallel to the x/z plane with the progressive front surface (both surfaces are symmetric to x=0), are shown.

In the example version shown, the main meridian of the front surface 1 is plane and is situated in the lens centre (x=0). Additionally, the main meridian is an umbilical point line.

Figure 3:
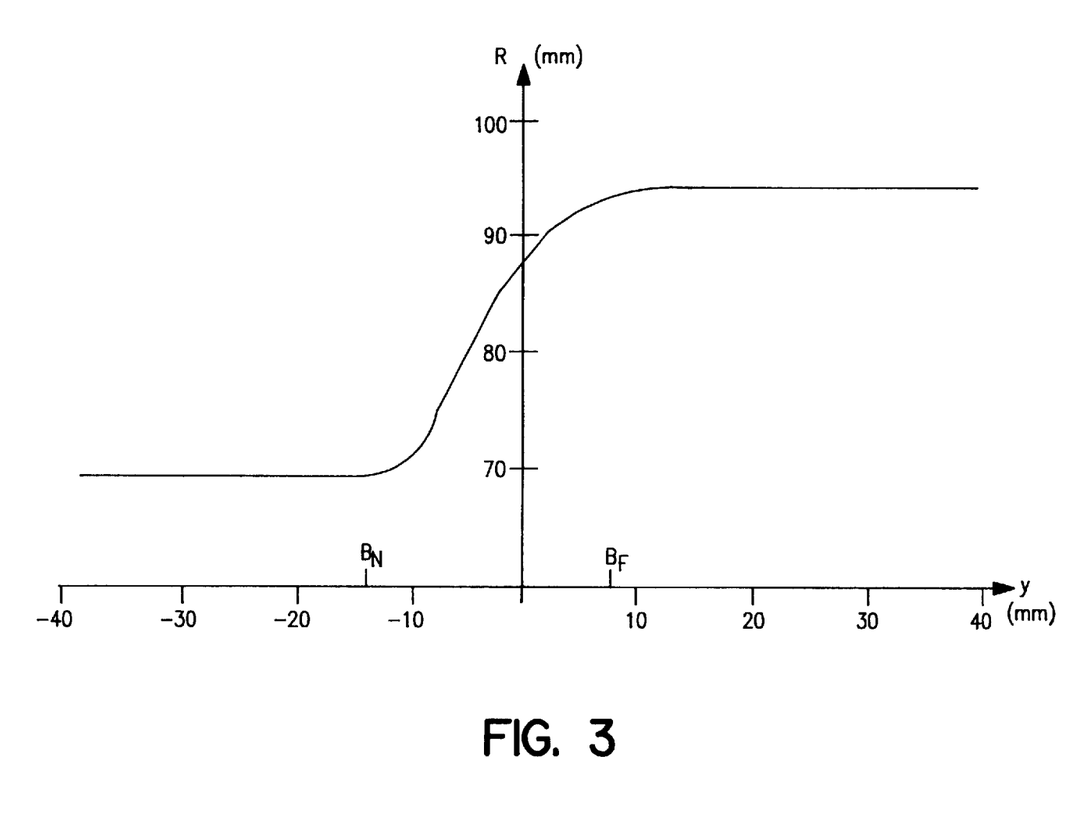
FIG. 3 shows the course of the main meridian of the version example in accordance with FIG. 2.

FIG. 3 shows the dependence of the curvature radius R of the main meridian on y for the version example shown.

As can be seen, the surface focal power on the main meridian is practically constant in the distance portion and in the reading portion and increases in the progression area in a substantially linear manner from the value of the distance portion to the value of the reading portion.

Figure 4:
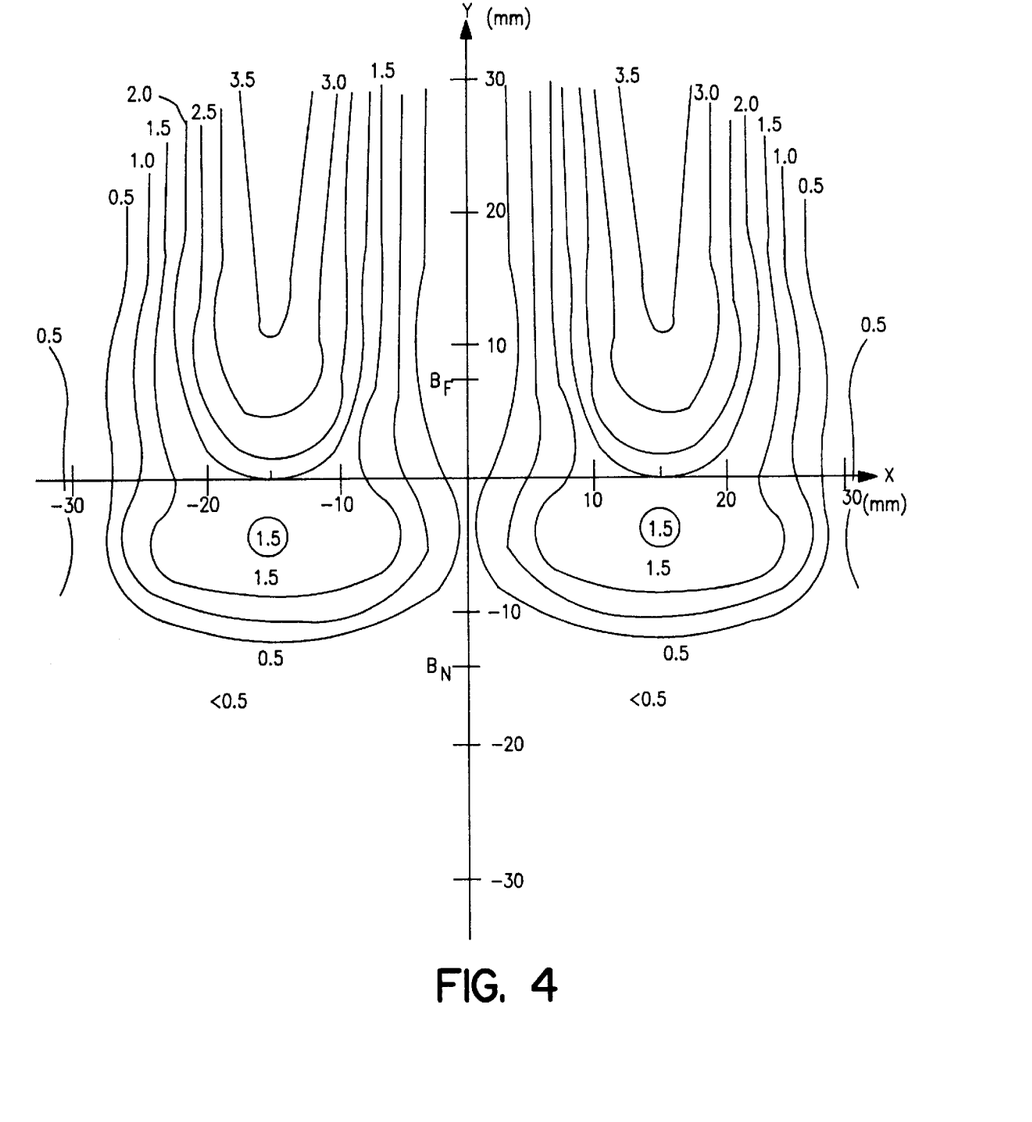
FIG. 4 illustrates lines of equal surface astigmatism for the front surface of the version example in accordance with FIG. 2.

FIG. 4 shows the surface astigmatism of the front surface 1 according to FIG. 2. As can be seen, the surface astigmatism—particularly in the distance portion—is very high outside the main meridian. In the progression area which extends roughly from y=+6 to y=−14 mm, the surface astigmatism is comparatively small and very low in the large reading portion, i.e. less than 0.5 D.

Figure 5:
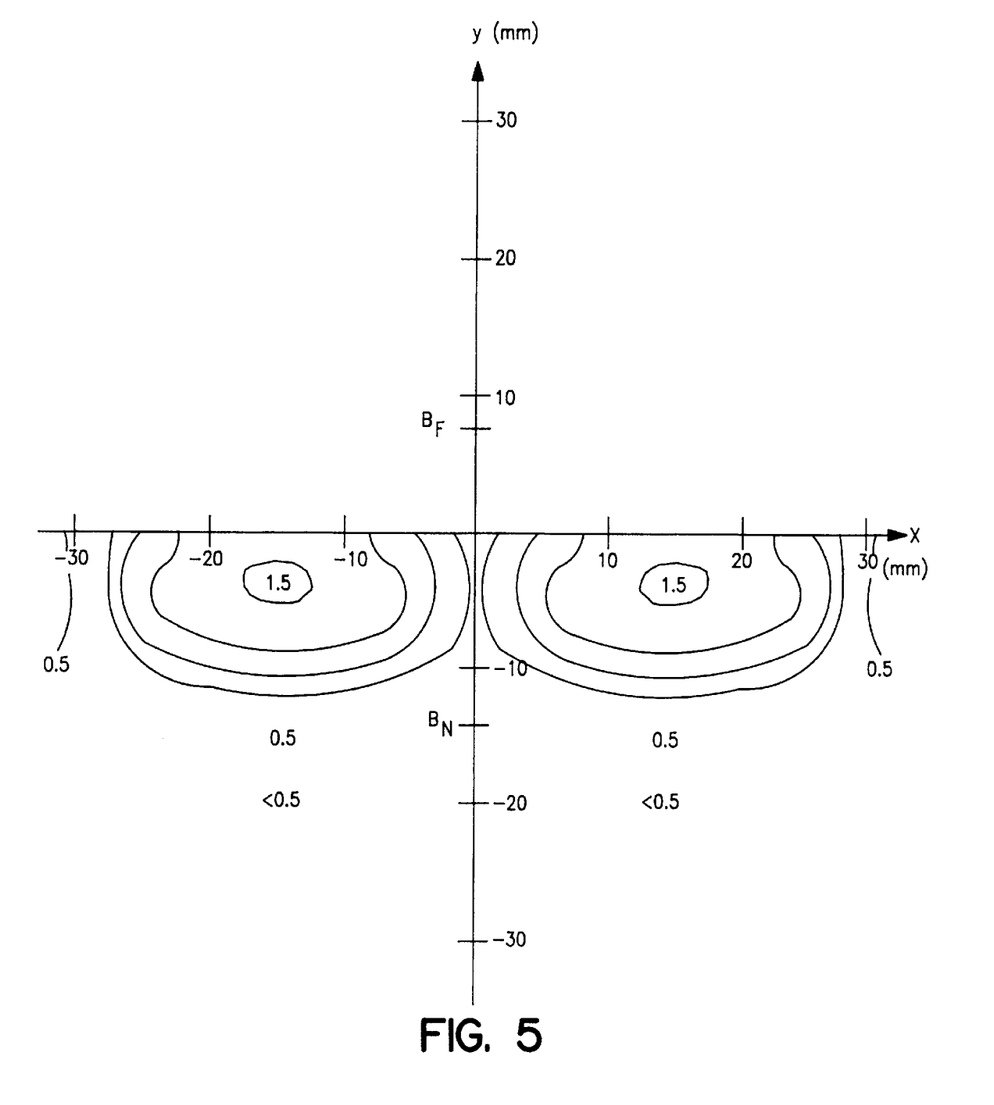
FIG. 5 illustrates lines of equal astigmatism of a progressive spectacle lens with which the front surface is used in accordance with FIG. 2.
Figure 6:
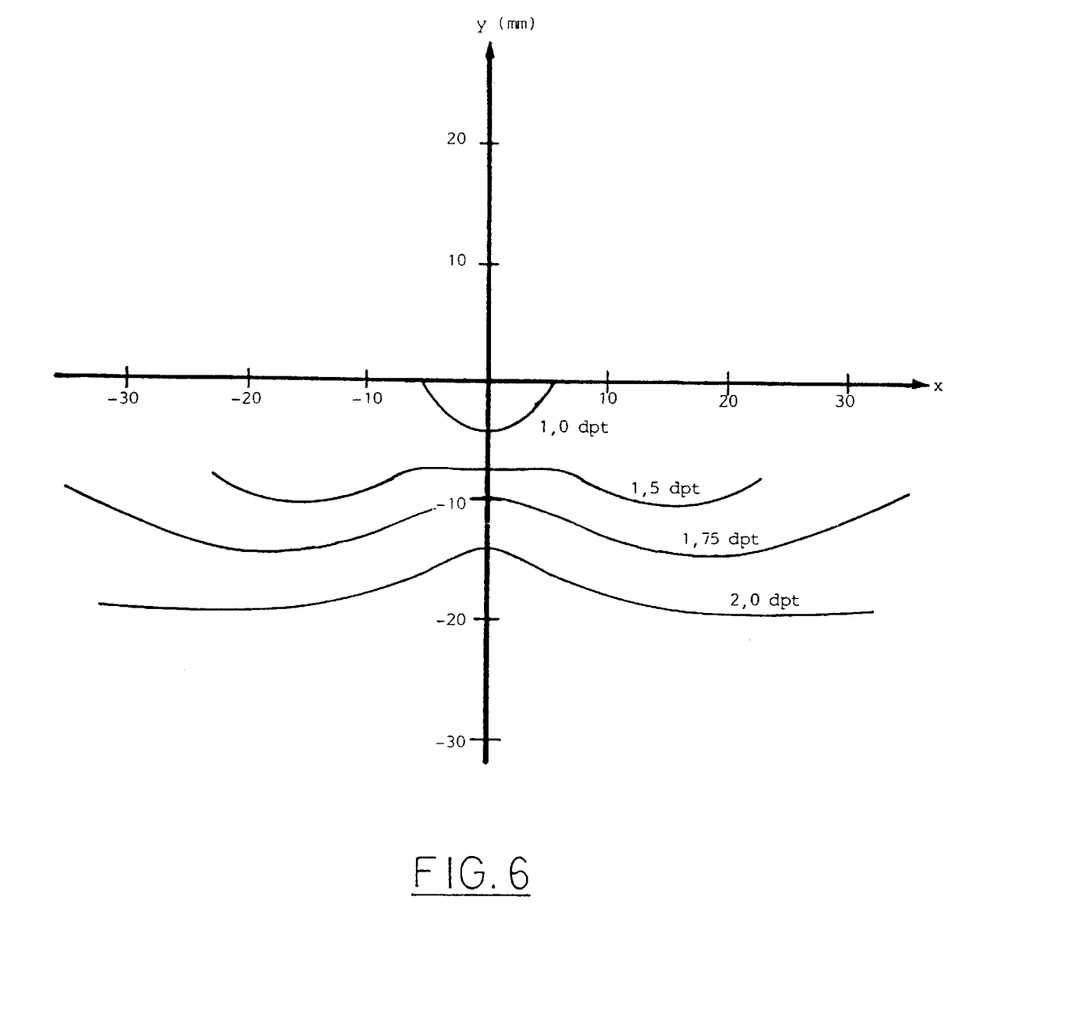
FIG. 6 shows the power lines of the spectacle lens in accordance with FIG. 5.

In FIGS. 4 to 6 $B_F$ and $B_N$ mark the distance reference point and the near reference point respectively in accordance with German Standard DIN 58208.

In the version example shown, the back surface 2 is constructed in the same way as the distance portion 3 of the front surface 1 in its part 6 (with the coordinates y ° 0). That is, the main curvature radii at each point of the concave back surface are equal to the main curvature radii of the corresponding point of the convex front surface. In this way, the part 6 of the back surface possesses a surface astigmatism value which is opposite and equal to the surface astigmatism of the front surface in the area of the distance portion 3.

In this way, the total astigmatism of the progressive spectacle lens according to this invention as shown in FIG. 5 is produced. As FIG. 5 shows, the distance portion and the reading portion of the progressive spectacle lens are largely free of astigmatism, i.e. the total astigmatism value is less than 0.5 D. It is true that a certain residual astigmatism remains in the progression area; however, that part of the progression corridor where the astigmatism has a value of less than 1 D along the main meridian is comparatively wide with a width of approximately 8 mm.

In addition, the course of the power lines—as shown in FIG. 6—is very favourable as these run almost horizontally, especially in the area of the main meridian.

Due to the fact that in the area of distance portion the main curvature radii of corresponding surface points of the front surface 1 and the back surface 2 are equal and opposite, the distance portion of the progressive spectacle lens has no optical power, or to put it another way, the distance portion is afocal.

Figure 7:
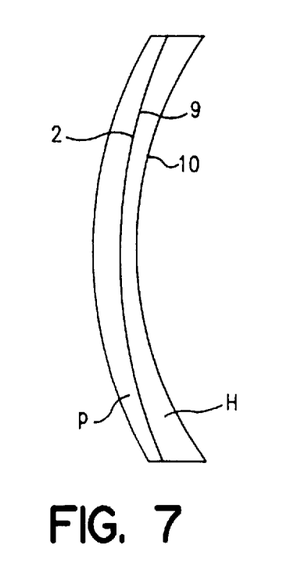
FIG. 7 is a section through a second version example of the present invention, whereby a second lens is fused on to obtain a defined power.

FIG. 7 shows a possibility of adapting a progressive spectacle lens whose front surface 1 and whose back surface 2 combine to produce a distance portion which by itself has no optical power to with modification to provide certain prescription values, i.e. to certain optical powers for the correction of ocular deficiencies for distance vision. To do this, another lens or an auxiliary lens H with surfaces 9 and 10 is affixed to the back surface 2 of the progressive spectacle lens P (for example with its surface 9). It is, of course, necessary to calculate the surface of the progressive spectacle lens P, onto which the auxiliary lens H is affixed, "not against air but against the material of the auxiliary lens". In this process, the auxiliary lens can, for example, be fused on or cemented on. It is of advantage when the surface of the progressive spectacle lens P is designed in such a way that the auxiliary lens sinks down on the surface of the progressive spectacle lens when the two lenses are fused together so that the working of the auxiliary lens is simplified prior to the joining with the progressive spectacle lens.

The desired prescription value of this "multilayer lens" is obtained in a known fashion by means of a corresponding design of the "free surface" of the auxiliary lens, i.e. in the version example shown in FIG. 7 the surface 10 of the auxiliary lens H.

A version example of the present invention has been described above. In the version example shown, the front surface and the back surface in the area of the distance portion have been constructed in agreement with each other, i.e. corresponding surface points show main curvature radii whose absolute value is equal to the absolute value of the corresponding main curvature radius of the other surface point. In this way, the distance portion is afocal, i.e. it has no optical power. It is, of course, possible at any time to design the back surface 2 in a different fashion relative to the front surface 1 in the area of the distance portion so that the distance portion will possess a desired optical power. And it will make no difference here that the surface astigmatism of the two surfaces do not cancel each other out completely in the periphery of the spectacle lens.

Furthermore, in the version example shown, the transition area 7 of the back surface 2 has a continuous design. It is, however, possible to design this transition area in a discontinuous fashion without difficulty. By means of spherical or toric surface parts 8, which are to be chosen accordingly, any desired addition can then be obtained while the front surface remains the same.

It is also possible to give even the back surface or both surfaces be given a progressive design instead of just the front surface.

The main meridians of both surfaces can be plane or winding; instead of an umbilical point line as the main meridian, a line can also be used which at least in part shows a defined astigmatism value; if both surfaces contribute to the power increase, i.e. are designed in a progressive fashion, then one surface may have an umbilical point line as main meridian while the main meridian of the other surface will have a defined astigmatism value.

Of course, the course of the main meridian(s) may deviate from that shown in FIG. 3: it is, for example, possible to use a main meridian whose curvature shows extreme values in which umbilical point lines run perpendicular to the main meridian.

Another lens affixed to one of the two surfaces of the progressive spectacle lens (an auxiliary lens) can additionally or exclusively be used for the correction of image reproduction errors of the progressive spectacle lens such as astigmatism, aberration and/or refraction error.

The spectacle lens according to this invention can be manufactured from conventional materials used in the manufacture of spectacle lens such as mineral glasses, plastic materials, etc. It is also possible to provide the lens with an additional refractive index gradient.

The manufacture of the progressive spectacle lens according to this invention can be done in a known fashion so that there is no need to go into this process in detail.

Accordingly, there is seen to be provided a progressive ophthalmological multifocal lens comprising a distance portion having a lens focal power for distance vision, a near portion having a lens focal power for near vision, and a progressive zone. The lens focal power in said progressive zone increases from the lens focal power in the distance portion to the lens focal power in the near portion. The lens has a preselected one of the front and rear surfaces which contributes solely to such increase in the lens focal power, the other of said surfaces not contributing to such increase in lens focal power. The lens focal power in both the distance and near portions is substantially constant, the preselected surface being so formed by selection of horizontal radii of surface curvature thereof that a major part of the surface astigmatism thereof is transposed into either the distance portion or the near portion but providing in the respective distance or near vision portion an area of said lens in which area vision is substantially exact. The surface opposite to said area has within said area curvature radii having absolute values equal to the absolute values of curvature radii of corresponding parts of said preselected surface, whereby the surface astigmatism of each of the front and rear surface of the lens are opposite and equal for substantially compensating for each other within said area to provide in the distance and near portions a total astigmatism of less than 0.5 D. The progression zone includes a relatively wide portion, i.e., a progression corridor, with low residual astigmatism. According to one variation, the preselected surface is the front surface and is convex aspherical, and according to another variation, the preselected surface is the rear surface and is concave aspherical. The distance portion may be be afocal, with the surface astigmatism being transposed into the distance portion. In any event, in the wide progression corridor extending between the rear and distance portions, the residual astigmatism has a value less than 1 D. So also, the distance portion may be afocal, with the surface astigmatism being transposed into the near vision portion. At least one of the front or rear surfaces satisfies the following equation in a cylindrical coordinate system $(y,\rho,\phi)$:

$$\rho(\phi, y) = \sum_{n=0}^{\infty} a_n(y) * \cos(n\,k(y))$$

where $a_n(y)$ have been selected in such a way that $\rho(o,y)$ describes the curve f(y) of the main meridian, k(y) is a function which increases monotonically from the reading portion to the distance portion preferably in the range of values from 3 to 10 or a number constant over the whole surface, preferably in the range from 3 to 10, and where the main meridian exhibits a curvature $$F(y)=f''(y)/(1+f'^2(y))^{3/2}$$

which satisfies the equation $$F(y)=A(1-(1+e^{-c(y+d)})^{-m}$$

where $A=\overline{D}_N-\overline{D}_F$, and $\overline{D}_N$ and $\overline{D}_F$ are respectively the mean surface focal power in the reading portion and the distance portion.

The variables c, d and m are as defined in coassigned Guilino et al. U.S. Pat. No. 4,315,673 (equation [6], col. 3, lines 48 ff.) herein incorporated by reference.

I claim:

1. A progressive ophthalmological multifocal lens, namely a spectacle lens, with a convex, aspherical front surface (1) and a concave back surface (2) having at least aspherical regions, of which at least one of which front and back surfaces contributes to power increase from a distance portion (3) over a progression zone (4) to a reading portion (5), wherein the front surface (1) or the front and the back surfaces (1,2) contributing to the power increase are designed in such a way that a main portion of astigmatism is transposed into an area of said distance portion (3) in which the power practically does not increase and that the surface astigmatism of said front and back surfaces (1,2) being essentially compensated by each other within said area (3) and a corresponding area (6) on said back surface (2).

2. A progressive ophthalmological multifocal lens according to claim 1 wherein said progression zone (4) extends between said reading portion (5) and said distance portion (3) providing residual astigmatism less than 1 D.

3. A progressive ophthalmological multifocal lens according to claim 1, said back surface (2) not contributing to the lens focal power increase providing either visual continuity or visual discontinuity within a transition area (7) located between said corresponding area (6) on said back surface into which said main portion of astigmatism is transposed and remaining surface portions (8).

4. A progressive ophthalmological multifocal lens according to claim 3 wherein said back surface (2) not contributing to the lens focal power increase has either spherical or toric design with the exception of said corresponding area (6) on said back surface and said transition area (7).

5. A progressive ophthalmological multifocal lens according to claim 1 wherein at least one of the front (1) or back (2) surfaces satisfies the following equation in a cylindrical coordinate system $(y,\rho,\phi)$:

$$\rho(\phi, y) = \sum_{n=0}^{\infty} a_n(y) * \cos(n\,k(y)\phi)$$

where $a_n(y)$ have been selected in such a way that $\rho(\phi,y)$ describes the curve f(y) of the main meridian, k(y) is a function which increases monotonically from the reading portion to the distance portion preferably in the range of values from 3 to 10 or a number constant over the whole surface, preferably in the range from 3 to 10, and where the main meridian exhibits a curvature $$F(y)=f''(y)/(1+f'^2(y))^{3/2}$$

which satisfies the equation $$F(y)=A(1-(1+e^{-c(y+d)})^{-m}$$

where $A=D_N-D_F$, and $D_N$ and $D_F$ are respectively the mean surface focal power in the reading portion and the distance portion.

6. A progressive ophthalmological multifocal lens according to claim 1 wherein the lens has substantially no optical power in the distance portion (3).

7. A progressive ophthalmological multifocal lens according to claim 1 wherein an auxiliary lens (H) is affixed to the back surface (2) thereof, the auxiliary lens having a rear surface (10) of either spherical or a toric design, and having a refractive index different from that of the progressive lens.

8. A progressive ophthalmological multifocal lens according to claim 1 wherein the progressive lens has substantially no optical power in the distance portion but the auxiliary lens provides a prescribed optical power in the distance portion (3) but the auxiliary lens provides a prescribed optical power in the distance portion.

\* \* \* \* \*